United States Patent
Chang et al.

(10) Patent No.: US 11,323,668 B2
(45) Date of Patent: May 3, 2022

(54) PROJECTION DEVICE AND CONTROLLING METHOD OF PROJECTION DEVICE

(71) Applicant: Coretronic Corporation, Hsin-Chu (TW)

(72) Inventors: Wen-Hsin Chang, Hsin-Chu (TW); Shun-Tai Chen, Hsin-Chu (TW); Tung-Yi Lu, Hsin-Chu (TW); Chen-Yi Hong, Hsin-Chu (TW)

(73) Assignee: Coretronic Corporation, Hsin-Chu (TW)

(*) Notice: Subject to any disclaimer, the term of this patent is extended or adjusted under 35 U.S.C. 154(b) by 33 days.

(21) Appl. No.: 16/833,683

(22) Filed: Mar. 30, 2020

(65) Prior Publication Data

US 2021/0092332 A1   Mar. 25, 2021

Related U.S. Application Data

(60) Provisional application No. 62/902,397, filed on Sep. 19, 2019.

(51) Int. Cl.
*H04N 9/31* (2006.01)

(52) U.S. Cl.
CPC ........... *H04N 9/312* (2013.01); *H04N 9/3155* (2013.01); *H04N 9/3197* (2013.01)

(58) Field of Classification Search
CPC .... H04N 9/312; H04N 9/3155; H04N 9/3197; H05B 35/00; G09G 3/3406; G09G 3/34; G09G 3/36; G02F 1/133; G02B 26/08
USPC ............................................ 348/759, 750, 43
See application file for complete search history.

(56) References Cited

U.S. PATENT DOCUMENTS

| | | | | |
|---|---|---|---|---|
| 5,731,797 A | * | 3/1998 | Akiyama | G09G 3/02 345/96 |
| 6,377,237 B1 | * | 4/2002 | Sojourner | G09G 3/3406 345/102 |
| 7,195,381 B2 | * | 3/2007 | Lynam | B60D 1/58 362/494 |
| 8,243,211 B2 | * | 8/2012 | Bazzani | H04N 9/3179 348/744 |
| 8,310,528 B2 | * | 11/2012 | Nagase | H04N 13/156 348/56 |

(Continued)

FOREIGN PATENT DOCUMENTS

| | | |
|---|---|---|
| CN | 102318338 | 1/2012 |
| CN | 102970546 | 3/2013 |

*Primary Examiner* — John W Miller
*Assistant Examiner* — Sean N. Haiem
(74) *Attorney, Agent, or Firm* — JCIPRNET

(57) ABSTRACT

A projection device and a controlling method of the projection device are provided. The projection device includes a light emitting module, a driver, a light valve, a projection lens and a processor. The light emitting module generates a light beam according to a driving current respectively. The driver generates the driving current and transmit the driving current to the light emitting module according to an operating signal. The light valve receives the light beam to form an image light beam. The projection lens projects the image light beam. The processor provides the operating signal with a default period to the driver and provides an operation of the light valve. According to the operating signal or the operation of the light valve, the driver generates the driving current lower than a default current during a first time interval in the default period.

20 Claims, 5 Drawing Sheets

(56) References Cited

U.S. PATENT DOCUMENTS

| | | | |
|---|---|---|---|
| 8,405,690 B2 * | 3/2013 | Goetz | G02F 1/133362 |
| | | | 345/691 |
| 9,307,602 B2 * | 4/2016 | Yang | H05B 45/14 |
| 9,373,285 B2 * | 6/2016 | Hada | H04N 9/3144 |
| 9,736,439 B2 * | 8/2017 | Xue | G06F 1/3203 |
| 2002/0159270 A1 * | 10/2002 | Lynam | B60Q 3/82 |
| | | | 362/492 |
| 2009/0256973 A1 * | 10/2009 | Bazzani | H04N 9/3161 |
| | | | 348/744 |
| 2010/0033555 A1 * | 2/2010 | Nagase | H04N 13/167 |
| | | | 348/43 |
| 2015/0130853 A1 * | 5/2015 | Hada | H04N 9/3155 |
| | | | 345/690 |
| 2016/0073069 A1 * | 3/2016 | Xue | H04N 9/3155 |
| | | | 348/750 |

* cited by examiner

PROJECTION DEVICE AND CONTROLLING METHOD OF PROJECTION DEVICE

CROSS-REFERENCE TO RELATED APPLICATION

This application claims the priority benefit of U.S. provisional application Ser. No. 62/902,397, filed on Sep. 19, 2019. The entirety of the above-mentioned patent application is hereby incorporated by reference herein and made a part of this specification.

BACKGROUND

Technical Field

The present invention generally relates to a projection device and a controlling method of the projection device. Particularly, the invention relates to a projection device and a controlling method of the projection device for improving a color coordinate performance and a contrast of a projected image of the projection device.

Description of Related Art

In the current technology, a projector modulates light with a light valve. The light valve is digital micro-mirror device, DMD having multiple micro reflective mirrors. When the light valve is operated at a turn-on state, the light valve adjusts the reflective mirrors to guide a light beam in one direction. So as that the light beam is guided into a projection lens. Therefore, the projector projects the light beam. When the light valve is operated at a turn-off state, the light valve adjusts the reflective mirrors to guide the light beam in other directions different from the direction at turn-on state. So as that the light beam is not guided into a projection lens. Therefore, the projector stops projecting the light beam.

However, when the light valve is operated at a turn-off state, the light beam that should not be guided into the projection lens is reflected at multiple times in the projector and eventually is reflected into the reception range of the projection lens. Therefore, a color coordinate performance and a contrast of a projected image of the projector would be affected.

The information disclosed in this Background section is only for enhancement of understanding of the background of the described technology and therefore it may contain information that does not form the prior art that is already known to a person of ordinary skill in the art. Further, the information disclosed in the Background section does not mean that one or more problems to be resolved by one or more embodiments of the invention were acknowledged by a person of ordinary skill in the art.

SUMMARY

The present invention is directed to a projection device and a controlling method of the projection device with high color coordinate performance and a high contrast of a projected image.

The invention provides a projection device. The projection device includes at least one light emitting module, a driver, a light valve, a projection lens and a processor. The at least one light emitting module generates at least one light beam according to a driving current respectively. The driver is coupled to the at least one light emitting module. The driver generates the driving current and transmit the driving current to the at least one light emitting module according to at least one operating signal. The light valve is disposed on a transmission path of the at least one light beam. The light valve receives the at least one light beam to form an image light beam. The projection lens is disposed on a transmission path of the image light beam. The projection lens projects the image light beam. The processor is coupled to the driver and the light valve. The processor provides the at least one operating signal with a default period to the driver and provide an operation of the light valve. According to the at least one operating signal, the driver generates the driving current lower than a default current during a first time interval in the default period.

The invention provides a controlling method of a projection device. The controlling method includes: generating, by at least one light emitting module, at least one light beam according to a driving current respectively; receiving, by a light valve, the at least one light beam to form an image light beam and projecting the image light beam; providing at least one operating signal and providing a control signal with a default period; and generating, by a driver, a driving current according to the at least one operating signal, generating the driving current lower than a default current during a first time interval in the default period.

Accordingly, the driver generates the driving current lower than a default current during the first time interval according to the at least one operating signal or the operation of the light valve. The light emitting module does not generate the light beam in response to the driving current lower than a default current. During the first time interval, the light valve operates in a turn-off state, and the light emitting module does not generate the light beam LB to avoid stray light transmitted to the projection lens after serval reflections. Therefore, a color coordinate performance and a high contrast of a projected image of the projection device would be improved.

Other objectives, features and advantages of the present invention will be further understood from the further technological features disclosed by the embodiments of the present invention wherein there are shown and described preferred embodiments of this invention, simply by way of illustration of modes best suited to carry out the invention.

To make the aforementioned more comprehensible, several embodiments accompanied with drawings are described in detail as follows.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

It is to be understood that other embodiment may be utilized and structural changes may be made without departing from the scope of the present invention. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless limited otherwise, the terms "connected," "coupled," and "mounted," and variations thereof herein are used broadly and encompass direct and indirect connections, couplings, and mountings.

Figure 1:
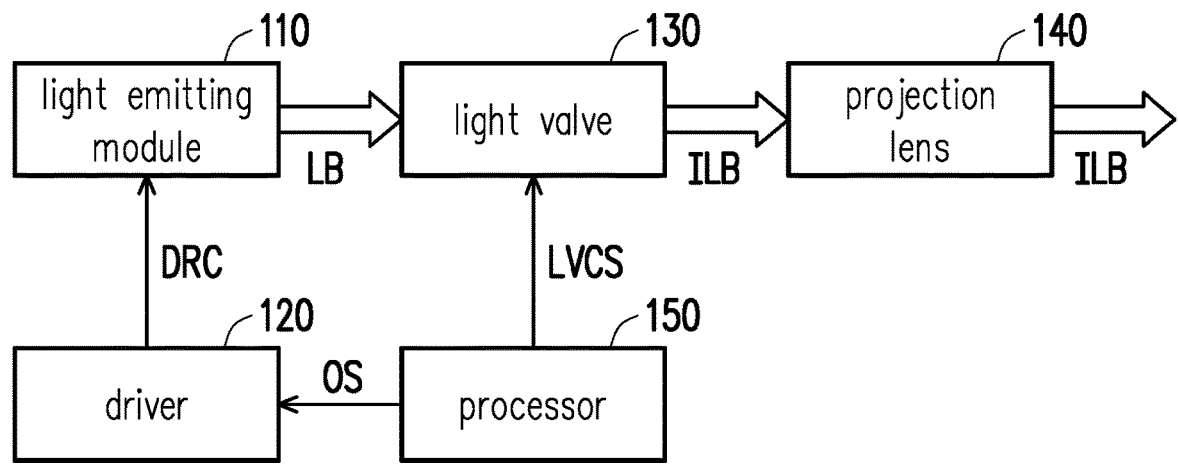
FIG. 1 illustrates a block diagram of a projection device according to an embodiment of the invention.

Referring to FIG. 1, FIG. 1 illustrates a block diagram of a projection device according to an embodiment of the invention. In the embodiment, the projection device 100 includes a light emitting module 110, a driver 120, a light valve 130, a projection lens 140 and a processor 150. The light emitting module 110 generates light beam LB according to a driving current DRC from the driver 120. The light emitting module 110 includes at least one any type of luminous element, for example, light emitting diode (LED) or laser diode. The driver 120 is coupled to the light emitting module 110. The driver 120 generates and transmits the driving current DRC to the light emitting module 110 according to operating signal OS. The driver 120 may be a led lighting driver integrated circuit. The light valve 130 is disposed on a transmission path of the light beam LB. The light valve 130 receives the light beam LB and forms an image light beam ILB according to the light beam LB based on a default period. In the embodiment, the default period includes the first time interval and a second time interval. The light valve 130 operates in a turn-on state during the second time interval in the default period. In the turn-on state, the light valve 130 may guide the image light beam ILB into the projection lens 140. The projection device 100 may be a projector. The projector may project the image light beam ILB. The light valve 130 operates in a turn-off state during the first time interval in the default period in response to a controlling of the processor 150. In the turn-off state, the light valve 130 does not guide the image light beam ILB into the projection lens 140. Therefore, the projector stops projecting the image light beam ILB. In the embodiment, the light valve 130 may be implemented by digital micro-mirror device (DMD) or liquid crystal on silicon (LCOS), the invention is not limited to the embodiment. The projection lens 140 is disposed on a transmission path of the image light beam ILB. The projection lens 140 projects the image light beam ILB. In some embodiments, the number of the light emitting module 110, the driver 120, the light beam LB may be more than 1. The number of the light emitting module 110, the driver 120, the light beam LB of the invention is not limited to the embodiment.

In the embodiment, the processor 150 is electrically coupled to the driver 120 and the light valve 130. The processor 150 provides the operating signal OS with the default period to the driver 120 and provides a light valve control signal LVCS to operate the light valve 130. The driver 120 generates the driving current DRC lower than a default current during the first time interval according to the operating signal OS or the operation of the light valve 130. In the embodiment, the default current may be equal to or lower than 200 milli-ampere. For example, the default current may be substantially equal to 200 milli-ampere. The light emitting module 110 does not generate the light beam LB in response to the driving current DRC lower than a default current. During the first time interval, the light valve 130 operates in a turn-off state, and the light emitting module 110 may not generate the light beam LB. Therefore, a color coordinate performance and a high contrast of a projected image of the projection device would be improved.

Figure 2:
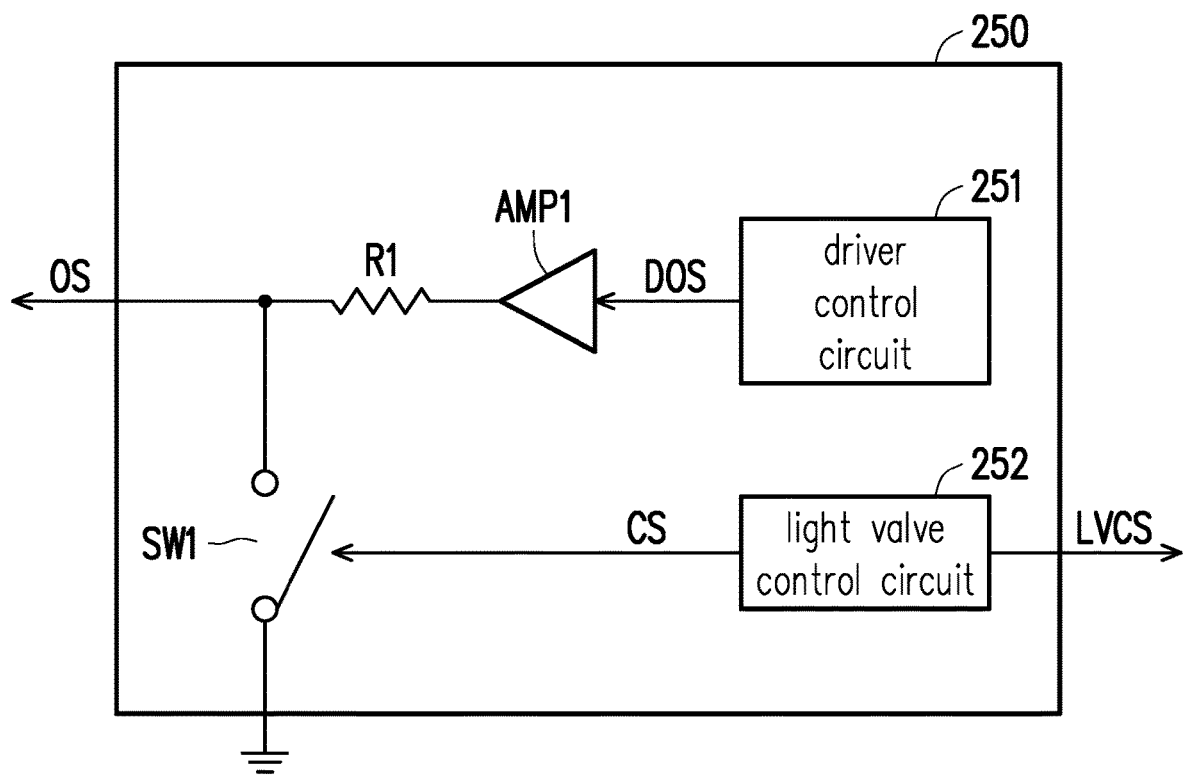
FIG. 2 illustrates a block diagram of a processor according to an embodiment of the invention.

Referring to FIG. 1 and FIG. 2, FIG. 2 illustrates a block diagram of a processor according to an embodiment of the invention. The processor 250 may be used as the processor 150 in FIG. 1. In the embodiment, the processor 250 includes a driver control circuit 251, a light valve control circuit 252 and a switch SW1. The driver control circuit 251 and the light valve control circuit 252 may be two portions of Digital Light Processing data processor (DLP data processor) which is a digital controller supporting reliable operation of digital micro-mirror device (DMD). For example, the driver control circuit 251 may be a LED or laser diode PWM generator, and the light valve control circuit 252 may be a DMD driving controller. The driver control circuit 251 generates a driving operating signal DOS and controls the operation of the driver 120. The light valve control circuit 252 is coupled to the light valve 130. The light valve control circuit 252 controls the operation of the light valve 130. The light valve 130 operates in one of the turn-on state and the turn-off state by a light valve control signal LVCS provided from the light valve control circuit 252. The light valve control circuit 252 generates a control signal CS during the first time interval. The switch SW1 has a first terminal, a second terminal and a control terminal. The first terminal of the switch SW1 is coupled to the driver 120 and the driver control circuit 251, the second terminal of the switch SW1 is coupled to a reference low voltage (e.g. grounded), and the control terminal of the switch SW1 is coupled to the light valve control circuit 252 to receive the control signal CS. The switch SW1 generate the operating signal OS via the first terminal. In the embodiment, the switch SW1 is turned-on to be in a closed state according to the control signal CS. In the closed state, the switch SW1 may pull down a voltage of the operating signal OS. In the embodiment, the switch SW1 is turned-on to be in the closed state (short circuit) according to the control signal CS at high logic level during the first time interval. The voltage of the operating signal OS is pulled down to the reference low voltage in the first time interval. Therefore, the driver 120 generates the driving current DRC lower than a default current during the first time interval in response to a low voltage level of the operating signal OS. On the other hands, the switch SW1 is turned-off to be in the opened state (open circuit) according to the control signal CS at low logic level during the second time interval. The voltage of the operating signal OS is response to the driving operating signal DOS. In the embodiment, the switch SW1 may be implemented by at least one transmission gate or any type of at least one transistor, the invention is not limited to the embodiment.

In the embodiment, the processor 250 further includes a resistor R1 and an amplifier AMP1. An input terminal of the amplifier AMP1 is coupled to the driver control circuit 251, and an output terminal of the amplifier AMP1 is coupled to the resistor R1. The resistor R1 and the amplifier AMP1 are coupled between the driver control circuit 251 and the switch SW1. In detail, an input terminal of the amplifier AMP1 is coupled to the driver control circuit 251, and the resistor R1 is coupled between the output terminal of the amplifier AMP1 and the first terminal of the switch SW1. The amplifier AMP1 gains the driving operating signal DOS. The resistor R1 may provide a resistor to increase the output impedance of the output terminal of the amplifier AMP1. Therefore, the damage of the amplifier AMP1 may be avoid when the switch SW1 changes the operations between the opened state and the closed state according to the control signal CS.

Figure 3:
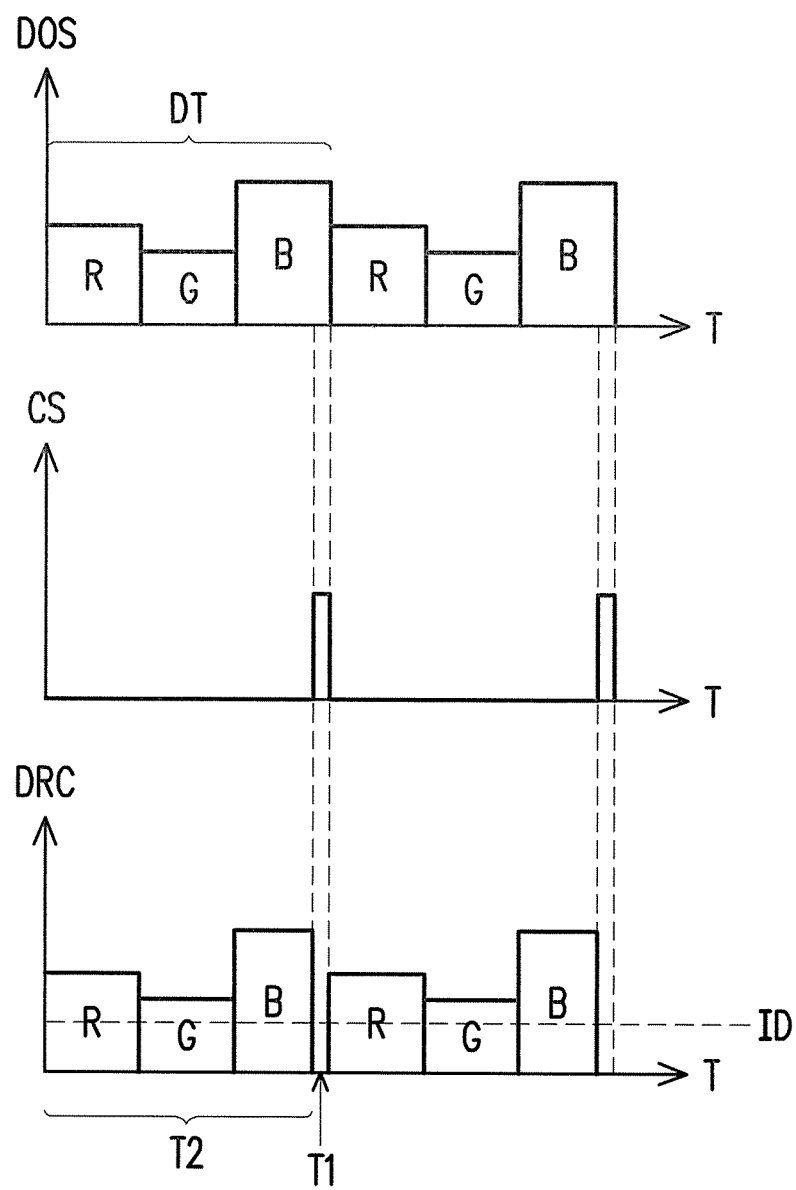
FIG. 3 illustrates timing diagrams of driving operating signal, control signal and driving current according to an embodiment of the invention.

Referring to FIG. 1, FIG. 2 and FIG. 3, FIG. 3 illustrates timing diagrams of driving operating signal, control signal and driving current according to an embodiment of the invention. In the embodiment, the driving operating signal DOS is supplied based on the default period DT by the driver control circuit 251. In addition, further referring to FIG. 3, the default period DT includes the first time interval T1 and the second time interval T2, wherein the control signal CS is supplied (in high state, for example, value "1") during the first time interval T1 in the default period DT by the light valve control circuit 252. Therefore, the driver 120 may generate the driving current DRC equal to or higher than the default current ID during the second time interval T2 in the default period DT and may generate the driving current DRC lower than the default current ID during the first time interval T1 in the default period DT. In the embodiment, the driving current DRC to drive the different luminous element within different color of the light emitting module 110 is applied fora red light based on the signal R, a green light based on the signal G and a blue light based on the signal B sequentially in the default period. In some embodiment, the driving current DRC indicates the light emitting module 110 applied for the green light, the red light and the blue light sequentially in the default period. In some embodiment, the driving current DRC indicates the light emitting module 110 applied for the red light, the green light, the blue light and a yellow light sequentially in the default period, the invention is not limited to the embodiment.

Figure 4:
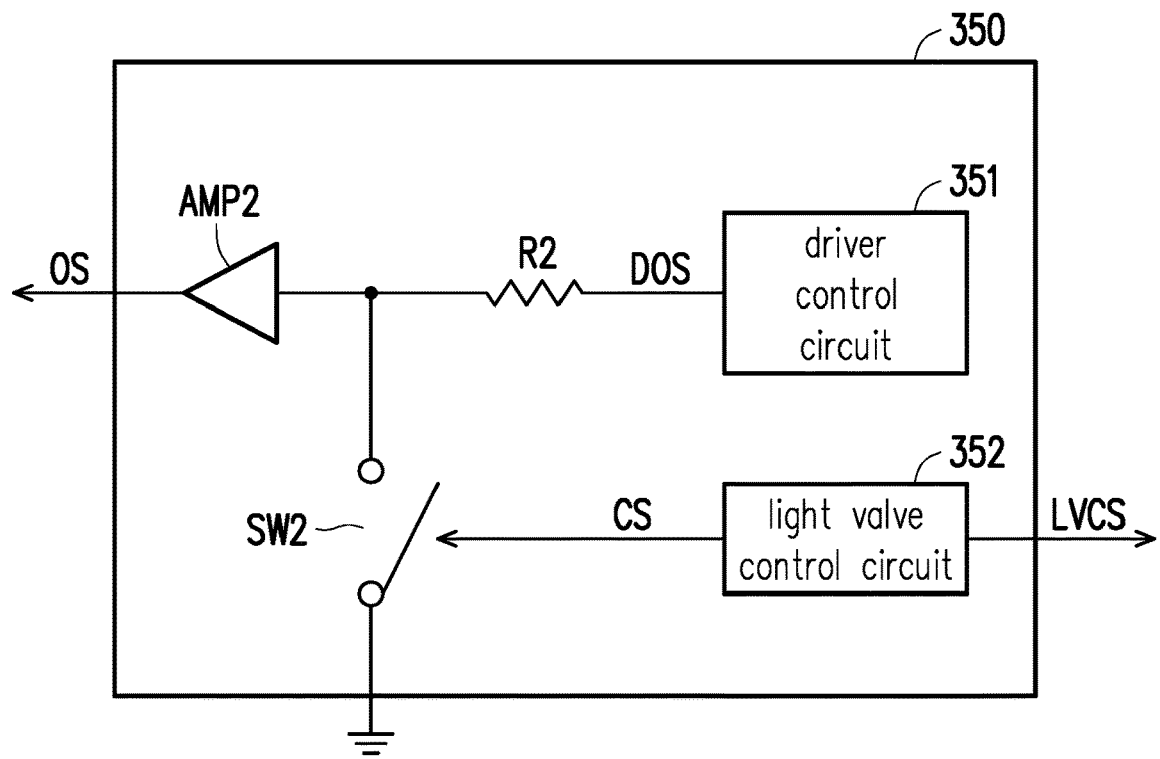
FIG. 4 illustrates a block diagram of a processor according to another embodiment of the invention.

Referring to FIG. 1 and FIG. 4, FIG. 4 illustrates a block diagram of a processor according to another embodiment of the invention. The processor 350 may be used as the processor 150 in FIG. 1. In the embodiment, the difference between the processor 350 in FIG.4 and the processor 250 in FIG. 2 the arrangement of an amplifier AMP2, a resistor R2 and switch SW2. In detail, an input terminal of the amplifier AMP2 is coupled to the resistor R2, and an output terminal of the input pin of the amplifier AMP1 is coupled to the driver 120. The resistor R2 is coupled between the amplifier AMP2 and the driver control circuit 351. The first terminal of the switch SW2 is coupled to the driver 120 and the driver control circuit 351, the second terminal of the switch SW2 is coupled to the reference low voltage, and the control terminal of the switch SW2 is coupled to the light valve control circuit 352 to receive the control signal CS. In the embodiment, the switch SW2 generates the operating signal OS via the first terminal. In the embodiment, the switch SW2 is turned-on to be in a closed state according to the control signal CS. In the closed state, the switch SW2 may pull down a voltage of the operating signal OS. The resistor R2 is coupled between the driver control circuit 351 and the first terminal of the switch SW2. The amplifier AMP2 is coupled between the first terminal of the switch SW2 and the driver 120. The amplifier AMP2 gains the operating signal OS. In the embodiment, the amplifier AMP2 is a buffer amplifier, for example, high speed buffer amplifier etc., to enlarge the driving capability of the processor 350; however, the invention is not limited to the embodiment.

Figure 5:
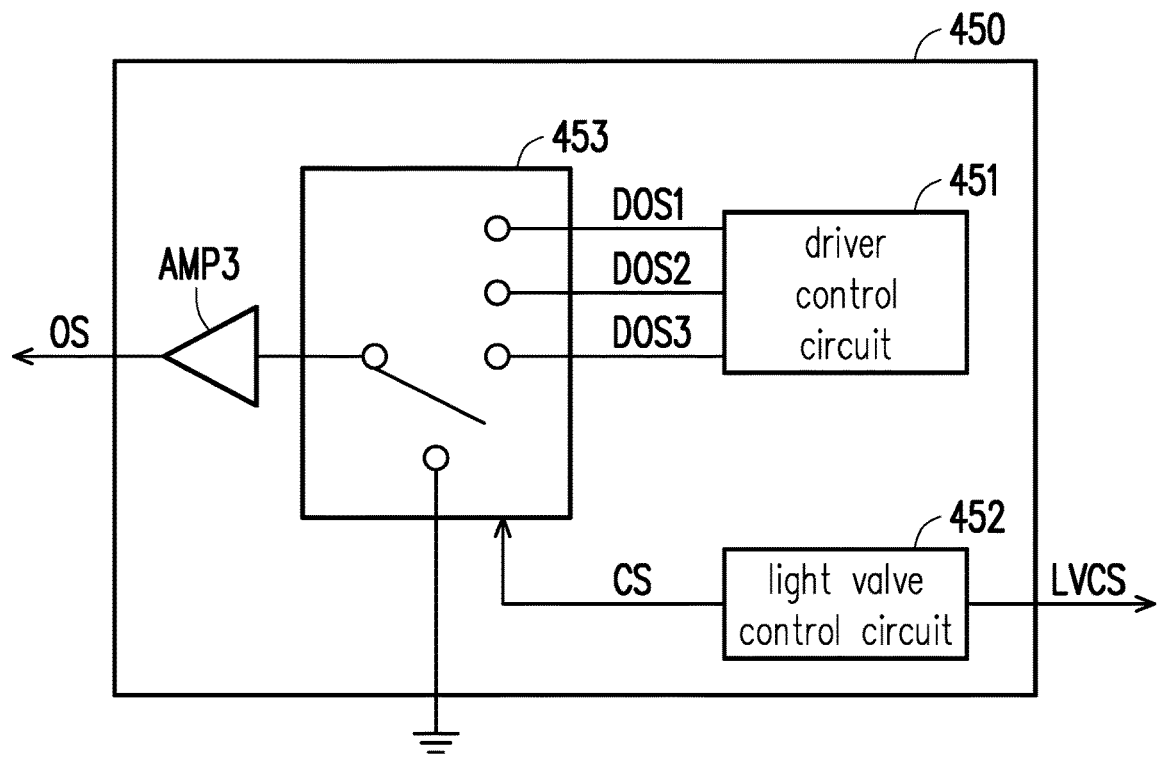
FIG. 5 illustrates a block diagram of a processor according to another embodiment of the invention.

Referring to FIG. 1 and FIG. 5, FIG. 5 illustrates a block diagram of a processor according to another embodiment of the invention. The processor 450 may be used as the processor 150 in FIG. 1. In the embodiment, the difference between the processor 450 in FIG. 5 and the processor 150 in FIG. 2 is that the processor 450 including the multiplexer 453 substituting the switch SW1, the resistor R1 and the amplifier AMP1. More specifically, the multiplexer 453 is coupled to the driver 120, a driver control circuit 451, a reference low voltage and a light valve control circuit 452. The multiplexer 453 may be, for example, a data selector and generates the operating signal OS by selecting between driving operating signals DOS1~DOS3 or the reference low voltage. In the embodiment, the multiplexer 453 sequentially receives one of the driving operating signals DOS1~DOS3 from the driver control circuit 451 or the reference low voltage according to the control signal CS received from the light valve control circuit 452. For example, the second time may further includes a first sub time interval, a second sub time interval and a third sub time interval, wherein the multiplexer 453 outputs the driving operating signal DOS1 as the operating signal OS during a first sub time interval the second time interval, outputs the driving operating signal DOS2 as the operating signal OS during a second sub time interval the second time interval, and outputs the driving operating signal DOS3 as the operating signal OS during a third sub time interval the second time interval. Furthermore, the multiplexer 453 outputs the reference low voltage as the operating signal OS during the first time interval. In one embodiment, the driver control circuit 451 may include three sub control circuits to generate the driving operating signals DOS1~DOS3, so that each driving operating signals DOS1~DOS3 indicates the light emitting module 110 applied for the green light, the red light and the blue light sequentially in the default period. In one embodiment, the multiplexer 453 may be multi-channel multiplexer and may have, for example, three output channels coupled to three different light emitting module 110, and the multiplexer 453 pull down the operating signal OS during first time interval according to the operating signal OS.

In one embodiment, the processor 450 further includes an amplifier AMP3 coupled to the output of the multiplexer 435. Therefore, the amplifier AMP3 gains the operating signal OS.

Figure 6:
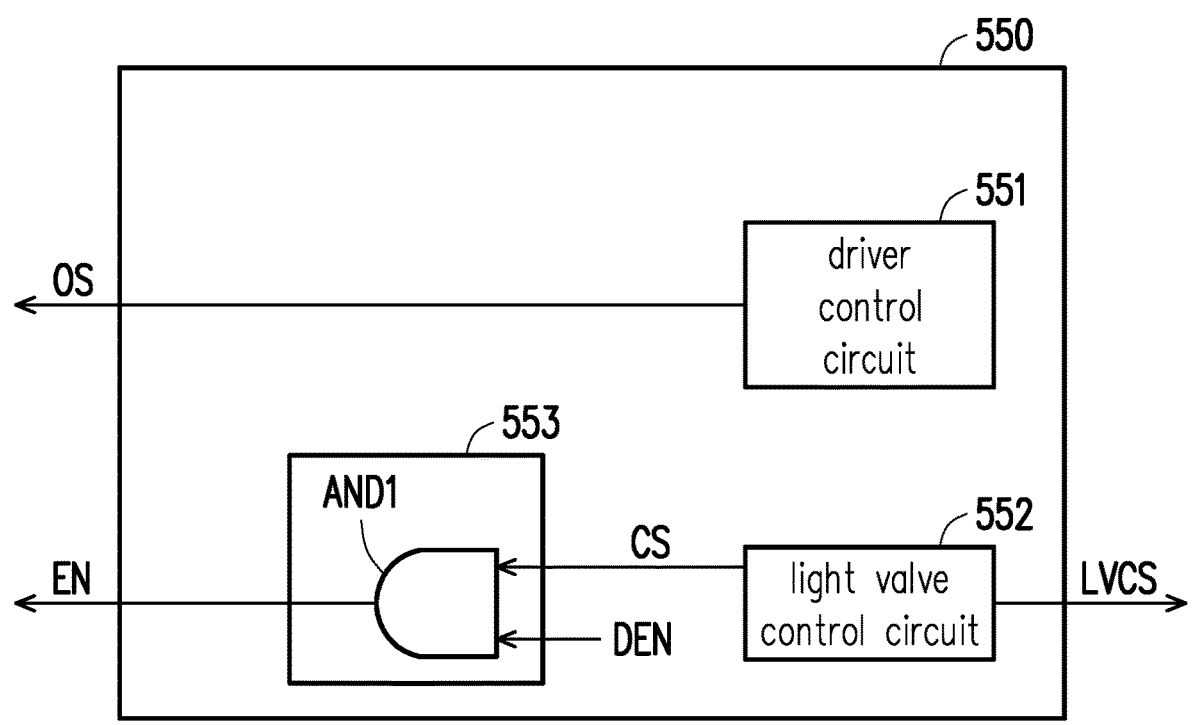
FIG. 6 illustrates a block diagram of a processor according to another embodiment of the invention.

Referring to FIG. 1 and FIG. 6, FIG. 6 illustrates a block diagram of a processor according to another embodiment of the invention. The processor 550 may be used as the processor 150 in FIG. 1. In the embodiment, the processor 550 includes a driver control circuit 551, a light valve control circuit 552 and a logic circuit 553. The driver control circuit 551 generates the operating signal OS and control the operation of the driver 120. The light valve control circuit 552 is coupled to the light valve 130. The light valve control circuit 552 controls the operation of the light valve 130, and generates the control signal CS during the first time interval. The logic circuit 553 is coupled between the driver 120 and the light valve control circuit 552. More specifically, an output terminal of the logic circuit 553 is coupled to an enable terminal (or pin) of the driver 120, and the input terminals of logic circuit 553 receives the control signal CS and a driver enable signal DEN indicating enabling the driver in any time. Such that, the logic circuit 553 disables the driver 120 when the control signal CS and/or the driver enable signal DEN is high state. That is, the logic circuit 553 can be achieved operation by any kind of logic element and/or analog element, the invention is not limit to the embodiment.

For example, the logic circuit 553 includes an AND logic gate AND1. The AND logic gate AND1 has a first input terminal, a second input terminal and an output terminal. The first input terminal of the AND logic gate AND1 receives the driver enable signal DEN. The second input terminal of the AND logic gate AND1 is coupled to the light valve control circuit 552 to receive the control signal CS. The output terminal of the AND logic gate AND1 is coupled to an enable terminal of the driver 120. In other words, the logic circuit 553 may operate an AND logic operation based on the control signal CS and the driver enable signal DEN, so as to generate an operating signal ES. Therefore, the logic circuit 553 may disable the driver 120 by a low state of the operating signal ES based on the high state of the control signal CS regardless of whether the logic state of the driver enable signal DEN is high or low. In one embodiment, the logic circuit 553 may enable the driver 120 by a high state of the operating signal ES based on a high state of the control signal CS and a high state of the driver enable signal DEN. In the embodiment, the driver enable signal DEN may be provided from the light valve control circuit 552 or other circuit outside from the processor 550.

Figure 7:
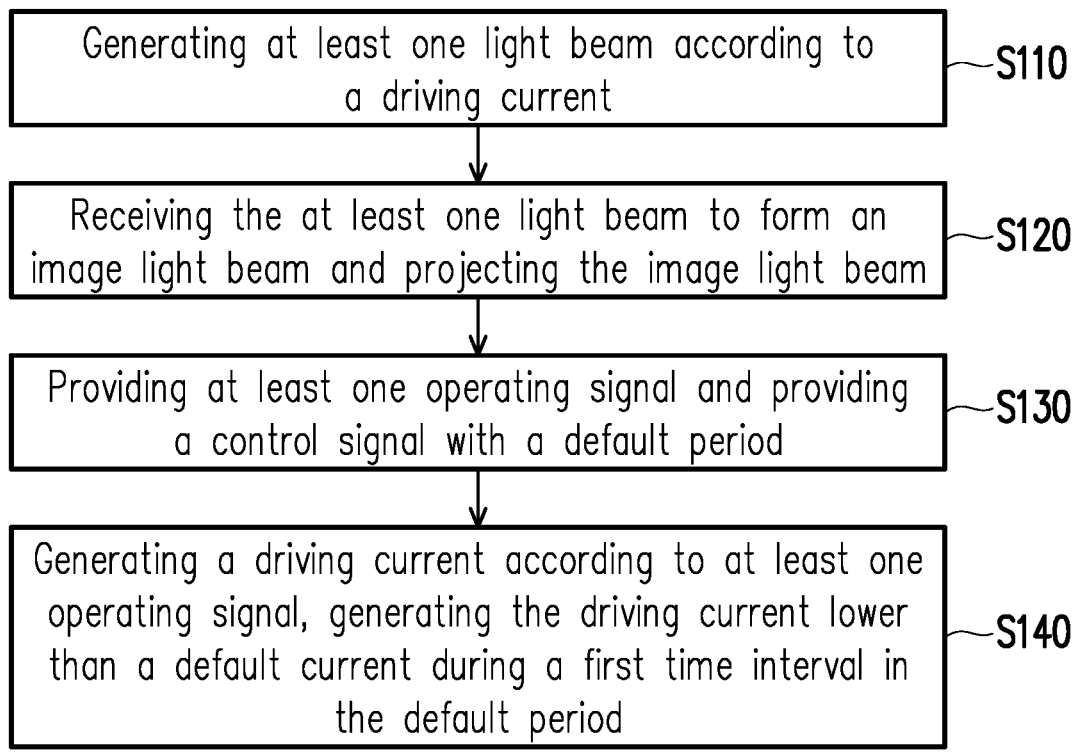
FIG. 7 illustrates a flow chart of a controlling method according to an embodiment of the invention.

Referring to FIG. 1 and FIG. 7, FIG. 7 illustrates a flow chart of a controlling method according to an embodiment of the invention. In the embodiment, in a step S110, the light emitting module 110 generates at least one light beam LB according to a driving current DRC respectively. In a step S120, a light valve 130 receives the at least one light beam LB to form an image light beam ILB and projection lens 140 projects the image light beam ILB. In a step S130, the processor 150 provides at least one operating signal OS and provides a control signal CS with a default period. In a step S140, the driver 120 generates a driving current DRC according to the at least one operating signal OS and generates the driving current DRC lower than a default current during a first time interval in the default period. The implementation details of steps S110 to S140 may be obtained in sufficient teaching or suggesting in the multiple embodiments of FIGS. 1 to 6, and therefore will not repeat the details again.

In summary, the driver generates the driving current lower than a default current during the first time interval according to the at least one operating signal or the operation of the light valve. The light emitting module does not generate the light beam in response to the driving current lower than a default current. The light valve operates in a turn-off state, and the light emitting module does not generate the light beam LB during the first time interval, so that to avoid stray light transmitted to the projection lens after serval reflections. Therefore, a color coordinate performance and a high contrast of a projected image of the projection device would be improved.

The foregoing description of the preferred embodiments of the invention has been presented for purposes of illustration and description. It is not intended to be exhaustive or to limit the invention to the precise form or to exemplary embodiments disclosed. Accordingly, the foregoing description should be regarded as illustrative rather than restrictive. Obviously, many modifications and variations will be apparent to practitioners skilled in this art. The embodiments are chosen and described in order to best explain the principles of the invention and its best mode practical application, thereby to enable persons skilled in the art to understand the invention for various embodiments and with various modifications as are suited to the particular use or implementation contemplated. It is intended that the scope of the invention be defined by the claims appended hereto and their equivalents in which all terms are meant in their broadest reasonable sense unless otherwise indicated. Therefore, the term "the invention", "the present invention" or the like does not necessarily limit the claim scope to a specific embodiment, and the reference to particularly preferred exemplary embodiments of the invention does not imply a limitation on the invention, and no such limitation is to be inferred. The invention is limited only by the spirit and scope of the appended claims. Moreover, these claims may refer to use "first", "second", etc. following with noun or element. Such terms should be understood as a nomenclature and should not be construed as giving the limitation on the number of the elements modified by such nomenclature unless specific number has been given. The abstract of the disclosure is provided to comply with the rules requiring an abstract, which will allow a searcher to quickly ascertain the subject matter of the technical disclosure of any patent issued from this disclosure. It is submitted with the understanding that it will not be used to interpret or limit the scope or meaning of the claims. Any advantages and benefits described may not apply to all embodiments of the invention. It should be appreciated that variations may be made in the embodiments described by persons skilled in the art without departing from the scope of the present invention as defined by the following claims. Moreover, no element and component in the present disclosure is intended to be dedicated to the public regardless of whether the element or component is explicitly recited in the following claims.

What is claimed is:

1. A projection device, comprising:
   at least one light emitting module, configured to generate at least one light beam according to a driving current respectively;
   a driver, coupled to the at least one light emitting module, configured to generate the driving current and transmit the driving current to the at least one light emitting module according to at least one operating signal;
   a light valve, disposed on a transmission path of the at least one light beam and configured to receive the at least one light beam to form an image light beam;
   a projection lens, disposed on a transmission path of the image light beam and configured to project the image light beam; and
   a processor, coupled to the light valve, wherein the processor includes a driver control circuit, the driver control circuit is connected via an amplifier to a resistor and to a switch that further connect to a light valve control circuit, configured to provide the at least one operating signal with a default period to the driver and provide an operation of the light valve, wherein according to the at least one operating signal, the driver generates the driving current lower than a default current during a first time interval in the default period.

2. The projection device as claimed in claim 1, wherein the default period is equal to a projecting time length of one pixel of the projection device.

3. The projection device as claimed in claim 1, wherein the default current is substantially equal to 200 milliampere.

4. The projection device as claimed in claim 1, wherein the driver control circuit is configured to generate at least one driving operating signal and control the operation of the driver; and the light valve control circuit is coupled to the light valve, configured to control the operation of the light valve, and generate a control signal during the first time interval;

wherein according the control signal and the at least one driving operating signal, the at least one operating signal indicates that the driver generates the driving current lower than the default current during the first time interval in the default period.

5. A projection device, comprising:

at least one light emitting module, configured to generate at least one light beam according to a driving current respectively;

a driver, coupled to the at least one light emitting module, configured to generate the driving current and transmit the driving current to the at least one light emitting module according to at least one operating signal;

a light valve, disposed on a transmission path of the at least one light beam and configured to receive the at least one light beam to form an image light beam;

a projection lens, disposed on a transmission path of the image light beam and configured to project the image light beam;

a processor, coupled to the driver and the light valve, configured to provide the at least one operating signal with a default period to the driver and provide an operation of the light valve, wherein according to the at least one operating signal, the driver generates the driving current lower than a default current during a first time interval in the default period, wherein the processor comprises:

a driver control circuit, configured to generate at least one driving operating signal and control the operation of the driver;

a light valve control circuit, coupled to the light valve, configured to control the operation of the light valve, and generate a control signal during the first time interval; and a switch, having a first terminal, a second terminal and a control terminal and configured to generate the at least one operating signal via the first terminal, wherein according the control signal and the at least one driving operating signal, the at least one operating signal indicates that the driver generates the driving current lower than the default current during the first time interval in the default period, wherein the first terminal is coupled to the driver and the driver control circuit, the second terminal is coupled to a reference low voltage, and the control terminal is coupled to the light valve control circuit to receive the control signal, wherein the switch is in a closed state to pull down a voltage of the at least one operating signal according to the control signal.

6. The projection device as claimed in claim 5, wherein the processor further comprises:

a resistor; and an amplifier, coupled to the resistor, wherein the resistor and the amplifier are coupled between the driver control circuit and the switch, and the amplifier is configured to gain the at least one driving operating signal.

7. The projection device as claimed in claim 5, wherein the processor further comprises:

a resistor; and an amplifier, coupled to the resistor, wherein the resistor is coupled between the driver control circuit and the switch, wherein the amplifier is coupled between the switch and the driver, wherein the amplifier is configured to gain the at least one operating signal.

8. The projection device as claimed in claim 4, wherein the processor further comprises:

a multiplexer, coupled to the driver, the driver control circuit, a reference low voltage and the light valve control circuit, and configured to generate the at least one operating signal via selecting between the at least one driving operating signal or the reference low voltage, wherein the multiplexer selects the reference low voltage as the at least one operating signal according to the control signal.

9. The projection device as claimed in claim 1, wherein the driver control circuit is configured to generate the at least one operating signal to control the operation of the driver, and the light valve control circuit, coupled to the light valve, is configured to control the operation of the light valve, and generate a control signal during the first time interval, and the processor further comprises:

a logic circuit, coupled to the driver and the light valve control circuit, and configured to disable the driver when the control signal is low state.

10. A projection device, comprising:

at least one light emitting module, configured to generate at least one light beam according to a driving current respectively;

a driver, coupled to the at least one light emitting module, configured to generate the driving current and transmit the driving current to the at least one light emitting module according to at least one operating signal;

a light valve, disposed on a transmission path of the at least one light beam and configured to receive the at least one light beam to form an image light beam;

a projection lens, disposed on a transmission path of the image light beam and configured to project the image light beam; and a processor, coupled to the driver and the light valve, configured to provide the at least one operating signal with a default period to the driver and provide an operation of the light valve, wherein according to the at least one operating signal, the driver generates the driving current lower than a default current during a first time interval in the default period, wherein the processor comprises:

a driver control circuit, configured to generate the at least one operating signal to control the operation of the driver; and a light valve control circuit, coupled to the light valve, configured to control the operation of the light valve, and generate a control signal during the first time interval; and a logic circuit, coupled to the driver and the light valve control circuit, and configured to disable the driver when the control signal is low state, wherein the logic circuit comprises:

an AND logic gate, having a first input terminal, a second input terminal and an output terminal and coupled to the driver, wherein the first input terminal receives a driver enable signal, the second input terminal receives the control signal, and the output terminal is coupled to an enable terminal of the driver.

11. The projection device as claimed in claim 1, wherein the default period includes the first time interval and a second time interval, and the light valve is in a turn on state during the second time interval in the default period and in a turn off state during the first time interval in the default period in response to a controlling of the processor.

12. A controlling method of a projection device, comprising:

generating, by at least one light emitting module, at least one light beam according to a driving current respectively;

receiving, by a light valve, the at least one light beam to form an image light beam and projecting the image light beam;

providing, by a processor coupled to the light valve, at least one operating signal and providing a control signal with a default period, wherein the processor includes a driver control circuit, the driver control circuit is connected via an amplifier to a resistor and to a switch that further connect to a light valve control circuit; and generating, by a driver, a driving current according to the at least one operating signal, wherein the driving current is lower than a default current during a first time interval in the default period.

13. The controlling method as claimed in claim 12, wherein the default period is equal to a projecting time length of one pixel of the projection device.

14. The controlling method as claimed in claim 12, wherein the default current is equal to 200 milli-ampere.

15. The controlling method as claimed in claim 12, wherein the step of generating the driving current according to the at least one operating signal, wherein the driving current is lower than the default current during the first time interval in the default period comprises:

generating, by the driver control circuit, at least one driving operating signal to control the operation of the driver; and controlling, by the light valve control circuit, the operation of the light valve, and generating the control signal during the first time interval, wherein according the control signal and the at least one driving operating signal, the at least one operating signal indicates that the driver generates the driving current lower than the default current during the first time interval in the default period.

16. The controlling method as claimed in claim 15, wherein the step of generating the driving current lower than the default current further comprises:

pulling down a voltage of the at least one operating signal according to the control signal.

17. The controlling method as claimed in claim 16, further comprising:

gaining the at least one operating signal or the at least one driving operating signal.

18. The controlling method as claimed in claim 15, further comprising:

selecting the reference low voltage as the at least one operating signal according to the control signal.

19. The controlling method as claimed in claim 12, wherein the step of generating the driving current according to the at least one operating signal, generating the driving current lower than the default current during the first time interval in the default period comprises:

generate a at least one operating signal and control the operation of the driver;

controlling the operation of the light valve, and generating a control signal during the first time interval; and disabling the driver when the control signal is low state.

20. The controlling method as claimed in claim 12, wherein the default period includes the first time interval and a second time interval, and the light valve is in a turn on state during the second time interval in the default period and in a turn off state during the first time interval in the default period in response to a controlling of the processor.

* * * * *